U. HASKINS.
SHAFT COUPLING.
APPLICATION FILED SEPT. 7, 1911.
1,031,927.
Patented July 9, 1912.
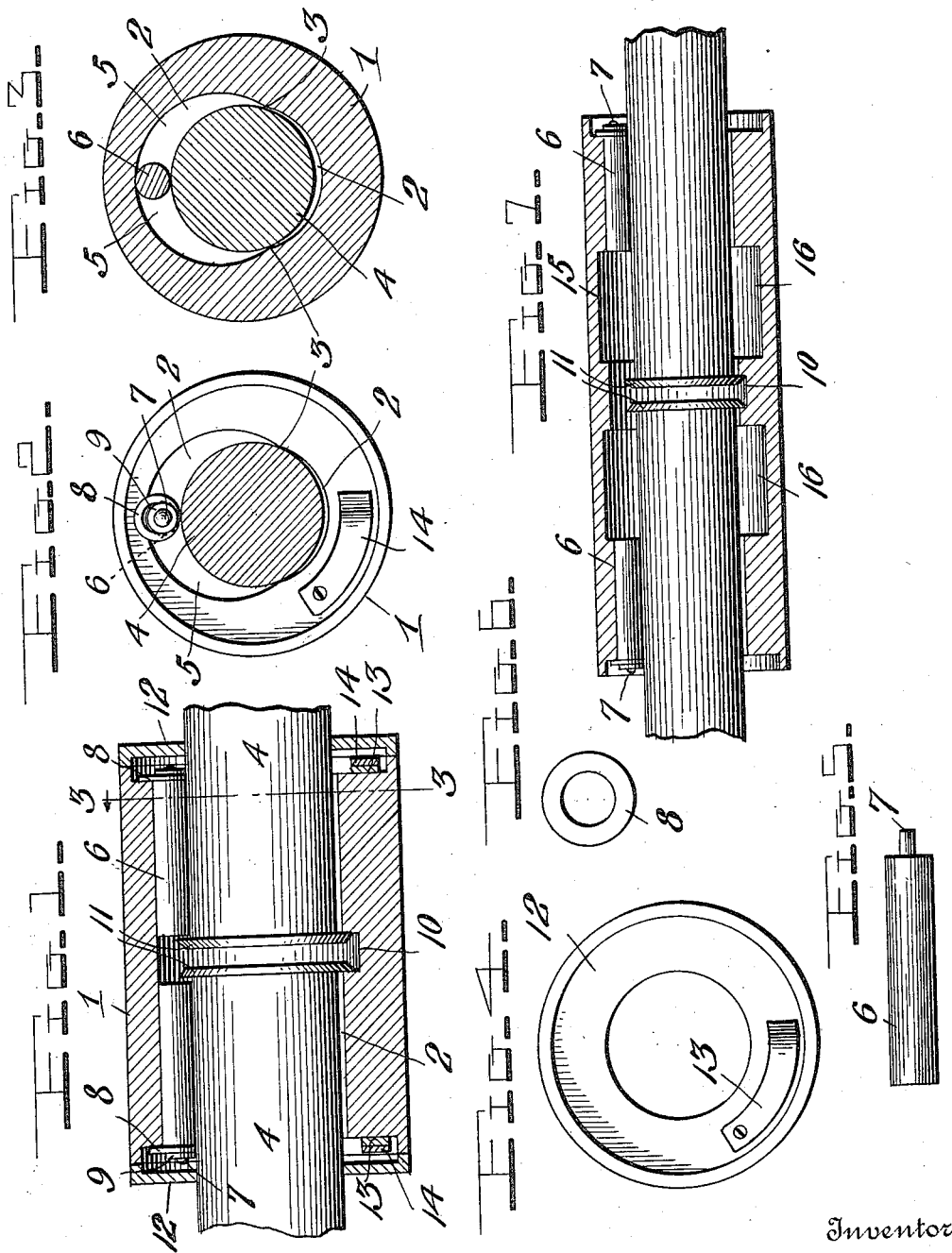
Witnesses
Chas. L. Griesbauer.
C. H. Griesbauer.
Inventor
Uri Haskins,
by H. B. Willson & Co.
Attorneys

UNITED STATES PATENT OFFICE.

URI HASKINS, OF ONTARIO, CALIFORNIA.

SHAFT-COUPLING.

1,031,927.   Specification of Letters Patent.   Patented July 9, 1912.

Application filed September 7, 1911. Serial No. 648,089.

*To all whom it may concern:*

Be it known that I, URI HASKINS, a citizen of the United States, residing at Ontario, in the county of San Bernardino and State of California, have invented certain new and useful Improvements in Shaft-Couplings; and I do declare the following to be a full, clear, and exact description of the invention, such as will enable others skilled in the art to which it appertains to make and use the same.

This invention relates to improvements in couplings for connecting the ends of shafting.

The object of the invention is to simplify the construction of couplings of this character and to provide simple and improved means whereby the ends of the shafts may be readily secured in the coupling.

With the foregoing and other objects in view, the invention consists of certain novel features of construction, combination and arrangement of parts as will be more fully described and particularly pointed out in the appended claim.

In the accompanying drawings, Figure 1 is a central longitudinal section through a coupling constructed in accordance with the invention showing the same applied to the ends of a shaft with the end caps arranged on the opposite ends of the coupling; Fig. 2 is an end view of one end of the coupling with the cap removed; Fig. 3 is a cross sectional view through one end of the coupling on the line 3—3 of Fig. 1; Fig. 4 is an inside view of one of the caps for the ends of the coupling; Fig. 5 is a detail view of one of the shaft fastening rollers; Fig. 6 is a plan view of one of the roller retaining washers; Fig. 7 is a central longitudinal section of a modified form of the coupling.

Referring more particularly to the drawings, 1 denotes my improved coupling, which preferably consists of a cylindrical body portion having formed therethrough a bore or passage 2 of irregular form, one side of which is of greater diameter than the opposite side, the walls of said opposite large and small sides or portions of the bore or passage being eccentric to the center of the coupling. The points along the opposite sides of the bore or passage where the larger and smaller parts of the latter meet form longitudinal gripping edges or rib-like members 3, which engage the opposite sides of the ends 4 of the shaft when engaged with the coupling. When the ends of the shaft are thus engaged with the coupling, a cam shaped space 5 is formed between the wall of the larger portion of the bore or passage and the adjacent side of the ends of the shaft, and in said cam space 5 and bearing against the opposing surface of the shaft and larger portion of the bore in each end of the coupling is arranged a wedging element in the form of a cylindrical roller 6, the diameter of which is equal to the greatest distance between the surface of the ends of the shaft and the wall of the enlarged portion of the bore or passage 2, said rollers thereby holding the ends of the shaft down into rigid engagement with the gripping edges 3 of said bore or passage and thus securely holding the ends of the shaft in the coupling.

In order to prevent the wedging rollers 6 from slipping back too far into the coupling, the outer ends of the rollers have formed thereon reduced stems 7 on which are arranged retaining washers 8, said washers having formed therein enlarged holes to receive the stems 7 whereby one edge of the washers will project beyond the edge of the passage through the coupling and into engagement with the inner wall of the recessed ends of the coupling, thus preventing the rollers 6 from slipping inwardly. The washers 8 are held in position on the stems 7 by fastening washers 9, the latter being secured in place by upsetting the ends of the stems as shown. When the rollers are thus arranged in place, the retaining and fastening washers on the outer ends thereof will lie within the recessed portions of the ends of the coupling as shown.

In forming the couplings, they are preferably cast with a centrally disposed passage and an annular groove or recess 10 is formed therein midway between the ends of the coupling. After the couplings are thus cast, the bore or passage through the same is reamed out to form the passage 2 of the shape herein shown and described, and in thus reaming out the bore, the annular recess 10 is cut away at one side of the passage but a portion of the recess is permitted to remain in the opposite side of the passage and the ends of the shafts are preferably upset or flattened to form an annular rim or bead 11, so that, when the ends of the shaft are inserted in the coupling, said rims or beads 11 engage the walls of the recess 10 and thereby prevent any longitudinal movement of the coupling on the ends of the shaft. It will be noted that the wedging rollers 6 are disposed in the ends of the coupling diametrically opposite to the recess 10, so that the beaded or upset ends of the shafts are held down into engagement with the recess.

In order to cover the recessed ends of the coupling, I provide suitable caps 12, which are in the form of recessed disks having a centrally disposed passage of a diameter equal to that of the shafts with which the caps are engaged before being applied to the ends of the coupling. In the recessed portion of the caps 12 are arranged spring fastening clips 13, which, when the caps are brought into operative position on the ends of the coupling, are adapted to be engaged with similar spring clips 14 secured in the recessed ends of the coupling, whereby said caps are removably held in place on the ends of the coupling to cover the ends of the passage formed therethrough.

In Fig. 7 of the drawing is shown an elongated form of the coupling 15 which is constructed and arranged in exactly the same manner as the shorter couplings except that the longer form of the coupling has cast therein annular recesses 16, which lighten the coupling and reduce the quantity of material required in forming the same. The elongated form of coupling is provided for connecting the ends of shafting which have been considerably damaged by keyways or other mutilations.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:—

A coupling of the class described having an irregular bore to receive the ends of shafts to be connected, said bore presenting oppositely-disposed gripping edges and a cam surface, a gripping roller arranged between said cam surface and the adjacent surface of a shaft end, an eccentrically-disposed retaining washer on the end of said roller, and means to hold said retaining washer in place.

In testimony whereof I have hereunto set my hand in presence of two subscribing witnesses.

URI HASKINS.

Witnesses:
   C. W. HARLE,
   F. E. SHEDDON.

---

Copies of this patent may be obtained for five cents each, by addressing the "Commissioner of Patents, Washington, D. C."